US011750570B1

(12) United States Patent
Eby et al.

(10) Patent No.: US 11,750,570 B1
(45) Date of Patent: Sep. 5, 2023

(54) DECENTRALIZED MESSAGING INBOX

(71) Applicant: American Express Travel Related Services Company, Inc., New York, NY (US)

(72) Inventors: Alaric M. Eby, Austin, TX (US); Andras L Ferenczi, Peoria, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 621 days.

(21) Appl. No.: 16/709,269

(22) Filed: Dec. 10, 2019

(51) Int. Cl.
| | |
|---|---|
| H04L 29/06 | (2006.01) |
| H04L 9/40 | (2022.01) |
| G06F 16/27 | (2019.01) |
| H04L 9/30 | (2006.01) |
| H04L 51/42 | (2022.01) |
| H04L 51/212 | (2022.01) |
| H04L 61/50 | (2022.01) |
| H04L 101/365 | (2022.01) |

(52) U.S. Cl.
CPC .......... *H04L 63/0428* (2013.01); *G06F 16/27* (2019.01); *H04L 9/3073* (2013.01); *H04L 51/212* (2022.05); *H04L 51/42* (2022.05); *H04L 61/50* (2022.05); *H04L 2101/365* (2022.05)

(58) Field of Classification Search
CPC . H04L 63/0428; H04L 9/3073; H04L 51/212; H04L 51/42; H04L 61/50; H04L 2101/365; G06F 16/27
USPC .......................................................... 713/154
See application file for complete search history.

(56) References Cited

U.S. PATENT DOCUMENTS

| | | | |
|---|---|---|---|
| 10,797,860 B1 * | 10/2020 | Dennis | H04L 9/14 |
| 2019/0188657 A1 * | 6/2019 | Arora | G06Q 20/38215 |
| 2019/0238319 A1 * | 8/2019 | Beck | H04L 9/0819 |
| 2020/0099667 A1 * | 3/2020 | Parthasarathy | H04L 63/108 |

* cited by examiner

*Primary Examiner* — Tu T Nguyen
(74) *Attorney, Agent, or Firm* — Thomas | Horstemeyer, LLP

(57) ABSTRACT

Disclosed are various embodiments for implementing a decentralized messaging system that allows users to exchange messages via an inbox maintained through a distributed ledger. A messaging inbox can be created for a user in a distributed ledger using an inbox address that includes a string of alphanumeric numbers without an identifying domain name or identifying information about the user. Furthermore, a user may define content preferences associated with the inbox that can be used by the distributed ledger to filter content received in the inbox to minimize unwanted or undesired content provided to the user.

20 Claims, 9 Drawing Sheets

DECENTRALIZED MESSAGING INBOX

BACKGROUND

Users can be associated with email addresses, or other types of unique identifiers for messaging accounts that allow users to send or receive messages over a network. Typically, email addresses include a user name and a domain name that is associated with the email server that acts as an intermediary in sending and receiving messages for user accounts. Personal email addresses can typically include at least a portion of a user's name that is associated with the messaging account.

Users can use email addresses for communicating with third party entities (e.g., marketing companies, businesses, individuals, etc.) over a network. As a user establishes an on-line presence, he or she may be required to provide an email address or other messaging address to set up accounts with social media platforms, electronic commerce platforms, banking platforms, and/or any other type of platform. As the user provides an email address to set up an account or expand his or her online presence, his or her email address as well as other corresponding information provided along with the email address may become publicly available. As such, third party entities may be able to search public platforms to either obtain a user's email address and/or use a user's email address to obtain personal information about the user.

An email address can be used to obtain a person's name, social media profiles, phone numbers, addresses, job status, and/or other information. Additionally, third party entities can use publicly available or otherwise obtained email addresses to send unwanted marketing information or other types of information to the user. Accordingly, anonymity may be advantageous where parties conduct transactions or communicate with strangers without face-to-face contact and are wary of giving out personal information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
FIGS. 1A-1D are pictorial diagrams of example user interfaces rendered according to various embodiments of the present disclosure.

Disclosed are various approaches for implementing a decentralized messaging system that allows users to privately exchange messages via an inbox maintained through a distributed ledger. In particular, a user may wish to establish an inbox for messaging with third party entities that allows the user to maintain his or her privacy and/or identity without disclosing his or her primary messaging address. According to various embodiments of the present disclosure, a messaging inbox can be created for a user in a distributed ledger using an inbox address comprising a string of alphanumeric numbers which does not include identifying information about the user. Furthermore, the user may define content preferences associated with the inbox that can be used by the distributed ledger to filter content received in the inbox to minimize unwanted or undesired content provided to the user.

Users can be linked to email addresses, or other types of messaging addresses, such that third party entities (e.g., marketing companies, businesses, individuals, etc.) can determine identifying information about a user based on his or her email address. In some situations, individuals may use an email address to set up accounts with social media platforms, electronic commerce platforms, banking platforms, and/or any other type of platform. As a user provides an email address to set up an account or further establish an online presence, his or her email address as well as other corresponding information provided along with the email address may become publicly available. As such, third party entities may search public platforms to either obtain a user's email address and/or use a user's email address to obtain personal information about the user based on the email address. For example, an email address can be used to obtain a person's name, social media profiles, phone numbers, addresses, job status, and/or other information. Additionally, third party entities can use publicly available or otherwise obtained email addresses to send unwanted marketing information or other types of information to the user.

In other examples, a user may wish to interact with another party in a peer-to-peer commerce transaction using an e-commerce application. For example, an e-commerce application that facilitates peer-to-peer commerce transactions may include, for example, CRAIGSLIST. However, while the user may be interested in an item being offered for sale by another party, the user may wish to communicate with the other party without giving out his or her primary email address. As such, the user may wish to create an inbox through the distributed ledger that is specific to the communications with the particular party and provides decentralized identity messaging.

According to various embodiments of the present application, a messaging application can be integrated with a mapper service that facilitates the generation of an inbox address that can be used to obtain and/or receive messages that are stored in a messaging inbox that is maintained in a distributed ledger (e.g., blockchain). According to various embodiments, the inbox address can include a string of alphanumeric numbers (e.g., blockchain address) that does not include any type of identifying information about the user. Upon creation of the inbox address, the mapper can interact with the distributed ledger to generate a messaging inbox for maintaining messages associated with the generated inbox address. According to various embodiments, the user may specify preferences associated with the established inbox that can be used to filter what type of content is received in the inbox. For example, if the user specifies that the created inbox is for fitness specific content, any messages sent from third party entities using the associated inbox address that includes content that is other than fitness related will not be accepted. In the following discussion, a general description of the system and its components is provided, followed by a discussion of the operation of the same.

FIGS. 1A-1D illustrate example user interfaces 100 (e.g., 100a, 100b, 100c, 100d) for a messaging application that allows a user to view, receive, and send messages (e.g., email messages, SMTP, instant messages, text messages) that are exchanged electronically through a communication forum. In some examples, the messaging application can include a stand-alone messaging application (e.g., WHATSAPP, MICROSOFT OUTLOOK, MOZILLA THUNDERBIRD, TWITTER, SNAPCHAT, INSTAGRAM etc.). In other examples, the messaging application can include a browser-based messaging application (e.g., GOOGLE's GMAIL service, YAHOO's YAHOO MAIL service, FACEBOOK MESSENGER etc.).

According to various embodiments of the present disclosure, the messaging application is integrated with a mapper that facilitates the creation of a messaging inbox that is maintained in a distributed ledger. An inbox is an electronic repository or other suitable electronic storage area for accepting and storing electronic messages associated with a particular electronic messaging address (e.g., email address). For example, a user may have a primary messaging address (e.g., email address) that is associated with an inbox provided by a particular messaging application or messaging server. The primary messaging address can include a user name and a domain name associated with the messaging server that facilitates the sending and receiving of messages over a network. The messaging application can provide an inbox for storing and displaying messages received in association with a user's primary messaging address. In some examples, a messaging application can provide multiple inboxes (e.g., spam) that can be used to filter content of messages received in association with a given messaging address.

In contrast to the inboxes associated with the messaging application, the messaging inbox associated with the mapper is registered through a distributed ledger. The mapper facilitates the creation of an inbox address 112 (FIG. 1C) and a corresponding messaging inbox that is established and maintained in a distributed ledger to provide privacy through decentralized messaging for the user. According to various embodiments, the messaging inbox maintained in the distributed ledger may be created and defined such that unwanted or otherwise undesirable content to the user may be ignored and not stored in the distributed ledger. As such, based on a user's preferences, only content desirable to the user can be received.

Referring back to FIGS. 1A-1D, the example user interfaces 100 illustrate views of a messaging application that is integrated with a mapper 233. In particular, the user can interact with the user interfaces 100 to create messaging inboxes maintained through the distributed ledger and/or to send and receive messages through the messaging inboxes according to various embodiments of the present disclosure. In contrast to the inboxes provided by the messaging application, the messaging inboxes associated with the mapper are created and maintained in a distributed ledger, and allow a user to communicate with third parties without disclosing identifying information that may compromise the identity of the user, thereby maintaining privacy for the user.

In particular, FIG. 1A illustrates a user interface 100a that displays messages of a personal inbox provided by the messaging application. In FIG. 1A, the user interface 100a further includes a panel that allows a user to select different inboxes to view from the listing of available inboxes. For example, the user interface 100a lists three different types of inboxes that are available for view by the user: a personal inbox, a spam inbox, and a first user-defined inbox. In this example, the personal may include the default inbox for messages received in association with the messaging address provided by the messaging application. The spam inbox may correspond to an inbox provided by the messaging application that stores messages filtered by the messaging application based on an indication that the messages are spam messages or otherwise unwanted messages by the user. The first user-defined inbox may correspond to a messaging inbox created based on a user's preferences to receive user-defined content and is maintained by the distributed ledger. Furthermore, the first user-defined inbox may be associated with an inbox address 112 that is generated by the mapper prior to the creation of the first-defined inbox in the distributed ledger.

The user interface 100a is designed to allow the user to interact with the messaging application to perform various actions. For example, the user may interact with user interface 100a to compose a message, reply to a message, forward a message, move a message to a different inbox, delete a message, and so on. The user interface 100a further includes a create new inbox component 118 which upon selection, triggers an action that facilitates the creation of a messaging inbox 215 that is maintained through the distributed ledger 203 according to various embodiments of the present disclosure.

Figure 1B:
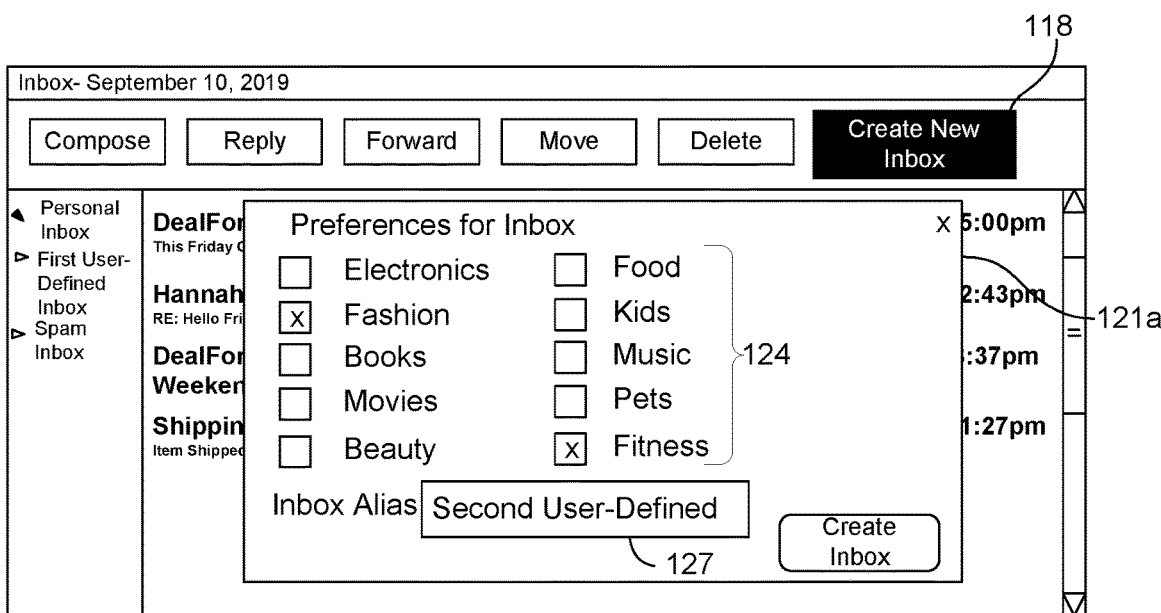

Turning now to FIG. 1B, shown is an example user interface 100b that may be displayed in response to a user interaction with the create new inbox component 118 of FIG. 1A according to various embodiments of the present disclosure. FIG. 1B includes a user interface component 121a that allows a user to select various preferences 124 associated with the new messaging inbox 215. Although the user interface component 121a includes a pop-up box, it should be noted that the user interface component 121a can include a card component, inline expansion component, and/or other type of component as can be appreciated.

Through interactions with the user interface component 121a, the user can select what type of content they wish to receive in the inbox and can further create an inbox alias 127 (FIG. 1B) that can be used to represent the messaging inbox. Upon identifying the preferences 124 and defining an inbox alias, the user can select a component in the user interface component 121a which triggers the creation of the inbox in accordance with various embodiments of the present disclosure. For example, the messaging application can send the obtained information to the mapper which can generate an inbox address 112 for the new messaging inbox. The mapper can then send a request to a node on the distributed ledger which invokes a distributed agent to generate the messaging inbox in the distributed ledger according to the defined preferences 124.

Figure 1C:
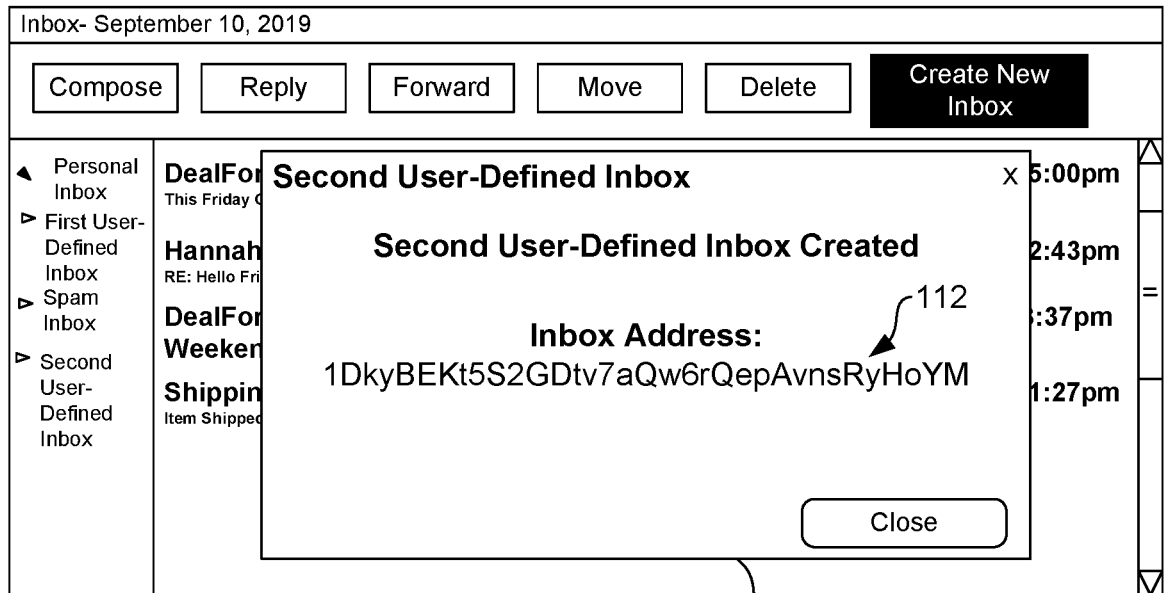

Moving on to FIG. 1C, shown is an example user interface 100c that may be displayed to the user following the generation of the inbox address 112 and corresponding inbox according to various embodiments of the present disclosure. As shown in FIG. 1C, the user interface 100c includes a user interface component 121b that displays the inbox address 112 associated with the generated inbox. As previously discussed, the inbox address 112 is generated by the mapper and corresponds to the messaging inbox 215 to be registered and maintained in the distributed ledger 203. The inbox address 112 may include a string of alphanumeric characters and is mapped to a particular area in the distributed ledger that is associated with the created inbox. According to various embodiments, the user can send and/or receive messages using the inbox address 112 instead of a traditional messaging address that includes a user name and a domain name for the messaging server. As shown in FIG. 1C, the listing of inboxes can be updated to include the created messaging inbox for selection and review.

Figure 1D:
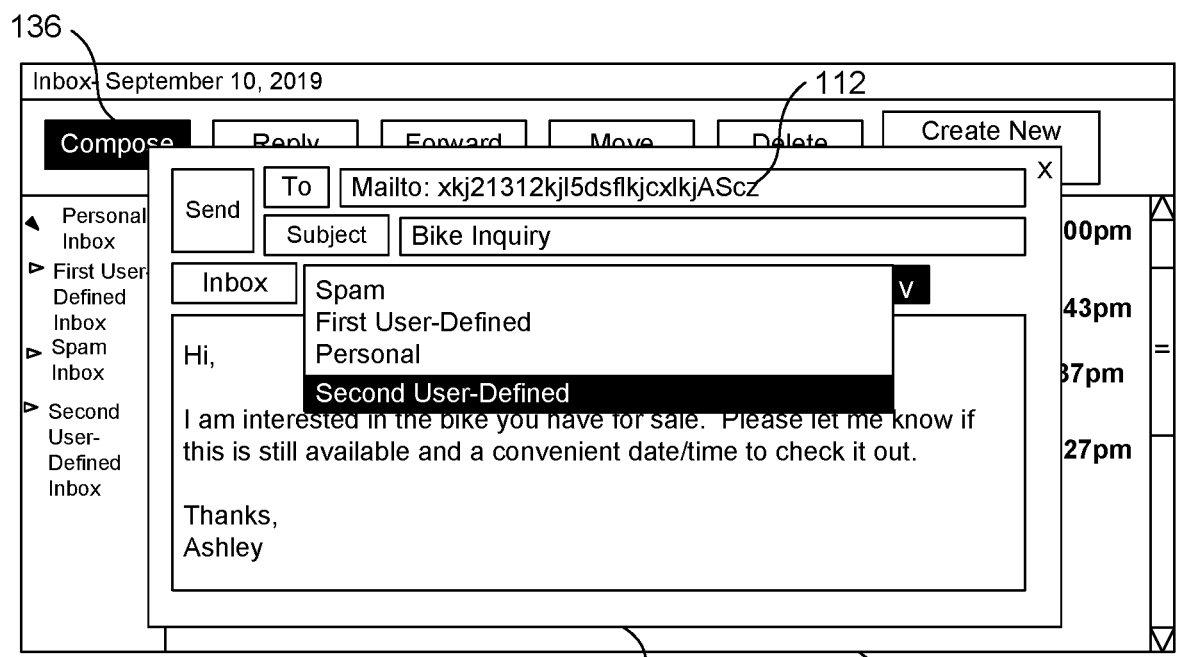

Referring next to FIG. 1D, shown is an example user interface 100d that illustrates how a user can send messages associated with the created messaging inbox to third party entities through interactions with the messaging application. In particular, FIG. 1D includes a send message component 133 that is presented following a user selection of a compose message component 136. The send message component 133 can include various interactive components that allow a user to identify the recipient of the message, the inbox associated with the sender of the message, and the subject of the message. In addition, the send message component 133 may include a text entry form that allows a user to compose the message.

In the example of FIG. 1D, the recipient inbox address 112 corresponds to an inbox address 112 for a messaging inbox maintained through the distributed ledger. In addition, the user is allowed to select a sender associated with any of the available inboxes provided by the messaging application or created by the mapper 233. In this example, the inbox aliases 127 for all messaging inboxes are shown for selection in addition to the traditional inboxes names. In this example, the user has selected the second user-defined inbox as the sender inbox for this message. As such, while the recipient identity is unknown, the sender identity will also be unknown as it is associated with the second user-defined inbox that is maintained through the distributed ledger.

Figure 2A:
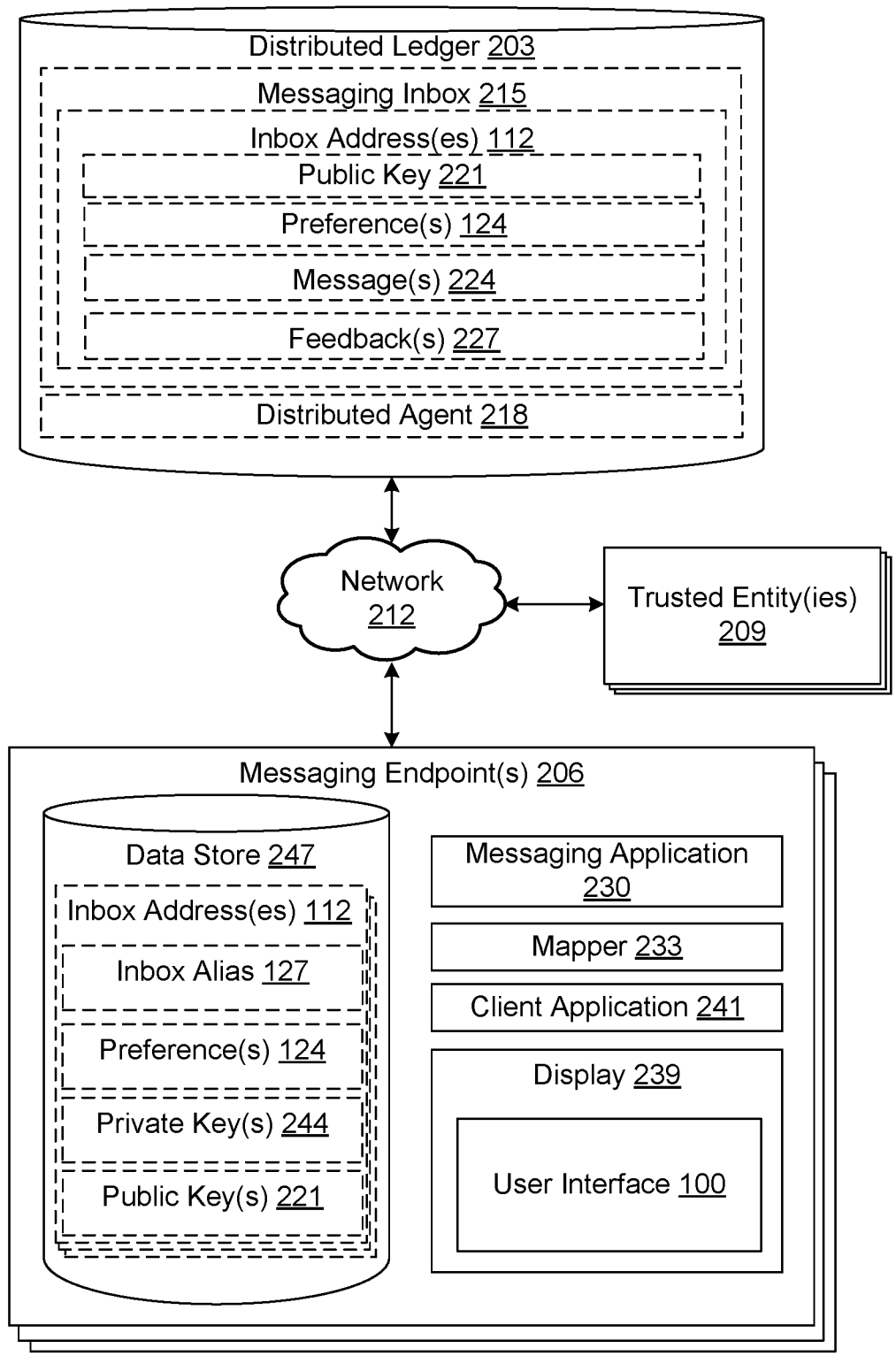
FIGS. 2A and 2B are drawings of a network environment according to various embodiments of the present disclosure.

With reference to FIG. 2A, shown is a network environment 200a according to various embodiments. The network environment 200a includes a distributed ledger 203, one or more messaging endpoints 206, and one or more trusted entities 209, which are in data communication with each other via a network 212. The network 212 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 212 can also include a combination of two or more networks 212. Examples of networks 212 can include the Internet, intranets, extranets, virtual private networks (VPNs), and similar networks.

The distributed ledger 203 represents a synchronized, eventually consistent, data store spread across multiple nodes in different geographic or network locations. Each member of the distributed ledger 203 can contain a replicated copy of the distributed ledger 203, including all data stored in the distributed ledger 203. Records of transactions involving the distributed ledger 203 can be shared or replicated using a peer-to-peer network connecting the individual members that form the distributed ledger 203. Once a transaction or record is recorded in the distributed ledger 203, it can be replicated across the peer-to-peer network until the record is eventually recorded with all members. Various consensus methods can be used to ensure that data is written reliably to the distributed ledger 203. Examples of a distributed ledger can include blockchains, distributed hash tables (DHTs), and similar data structures.

Various data can also be stored in a distributed ledger 203. This can include one or more messaging inboxes 215, a distributed agent 218, and/or other information. However, any other data discussed in the present disclosure could also be stored in the distributed ledger 203 if the public availability of the data were acceptable in that particular implementation.

A messaging inbox 215 can correspond to records in the distributed ledger 203 that are associated with a given inbox address 112. The messaging inbox 215 can include the inbox address 112 as well as various data that can be mapped to the inbox address 112. For example, the messaging inbox 215 can be mapped to a public key 221, preferences 124, messages 224, trusted entity feedback 227, and/or other data stored in the distributed ledger 203.

The inbox address 112 can include an identifier that represents a destination in the distributed ledger 203 for messages 224 that are sent to the user. For example, the inbox address 112 may include a string of alphanumeric characters having a predefined number of characters (e.g., 26-35 characters) that are created by the mapper 233 using cryptographic algorithms or other suitable algorithms. In some examples, the inbox address 112 can correspond to a distributed ledger address or other suitable type of identifier for the distributed ledger 203.

The public key 221 is part of an asymmetric cryptographic key-pair that is created by a mapper 233 to authenticate messages 224 associated with the inbox address 112. In particular, the public key 221 can be used to encrypt messages 224 to be received by the user associated with the inbox address 112. In some examples, the distributed agent 218 can encrypt messages 224 received with respect to the inbox address 112. In other examples, a message sender can access the public key 221 from the distributed ledger 203 and encrypt the message 224 prior to sending to the recipient.

The user-defined preferences 124 include a list of preferences that define the content for messages 224 that are permitted to be received for a given inbox 215. For example, the user-defined preferences 124 can correspond to themes or topics of content that may be included in content sent to the user. As such, the distributed agent 218 may filter content sent to the inbox address 112 based on the user-defined preferences 124. For instance, messages 224 that match the user-defined preferences are mapped to the inbox address 112 in the distributed ledger 203 while messages 224 that fail to match the user-defined preferences are not mapped to the inbox address 112 in the distributed ledger.

The feedback 227 includes data received from a trusted entity 209 that can be used to verify or otherwise certify the authenticity of a given inbox address 112. A trusted entity 209 can correspond to an entity that has interacted with the user of a given inbox address 112 and is considered to be trusted by other third parties. For example, a user may wish to verify the authenticity of a particular inbox address 112. As such, the user via a messaging application 230 and/or mapper 233 executed on a messaging endpoint 206 or messaging proxy 236 (FIG. 2B) can request verification of the inbox address 112. In response to the request, the distributed agent 218 can obtain the feedback 227 received from a trusted entity 209 and provide to the requesting messaging endpoint 206.

The distributed agent 218 can represent a script or other executable which can be stored in the distributed ledger 203 and executed by individual hosts or peers of the distributed ledger 203. When a computation is performed by the distributed agent 218, each host or peer that forms the distributed ledger 203 can perform the computation and compare its result with the results computed by other hosts or peers. When a sufficient number of hosts or peers forming the distributed ledger 203 agree on the result of the computation, the result can be stored in the distributed ledger 203 or provided to the computing device that invoked the distributed agent 218. An example of a distributed agent 218 is a "smart contract" used in the ETHEREUM platform, although other distributed ledger or blockchain-based technologies provide similar functionality.

For instance, a distributed agent 218 could be programmed to generate messaging inboxes 215 in the distributed ledger 203. In particular, there can be a unique distributed agent 218 stored in the distributed ledger 203 for each established inbox 215. For example, a distributed agent 218 can be configured to create messaging inboxes 215 according to a received inbox address 112. Furthermore, a distributed agent 218 can map the inbox address 112 to messages 224 received through the distributed ledger 203. In some examples, a distributed agent 218 can determine whether to map received messages to the inbox address 112 according to user-defined preferences 124 associated with the inbox address 112. For example, if a message 224 is sent to the inbox address 112, a distributed agent 218 may analyze the content of the message to determine if the content matches the content that is permitted according to the user-defined preferences 124. In some examples, a distributed agent 218 may determine the content of a message according to a keyword search of the content, sender data, and/or other information.

Figure 2B:
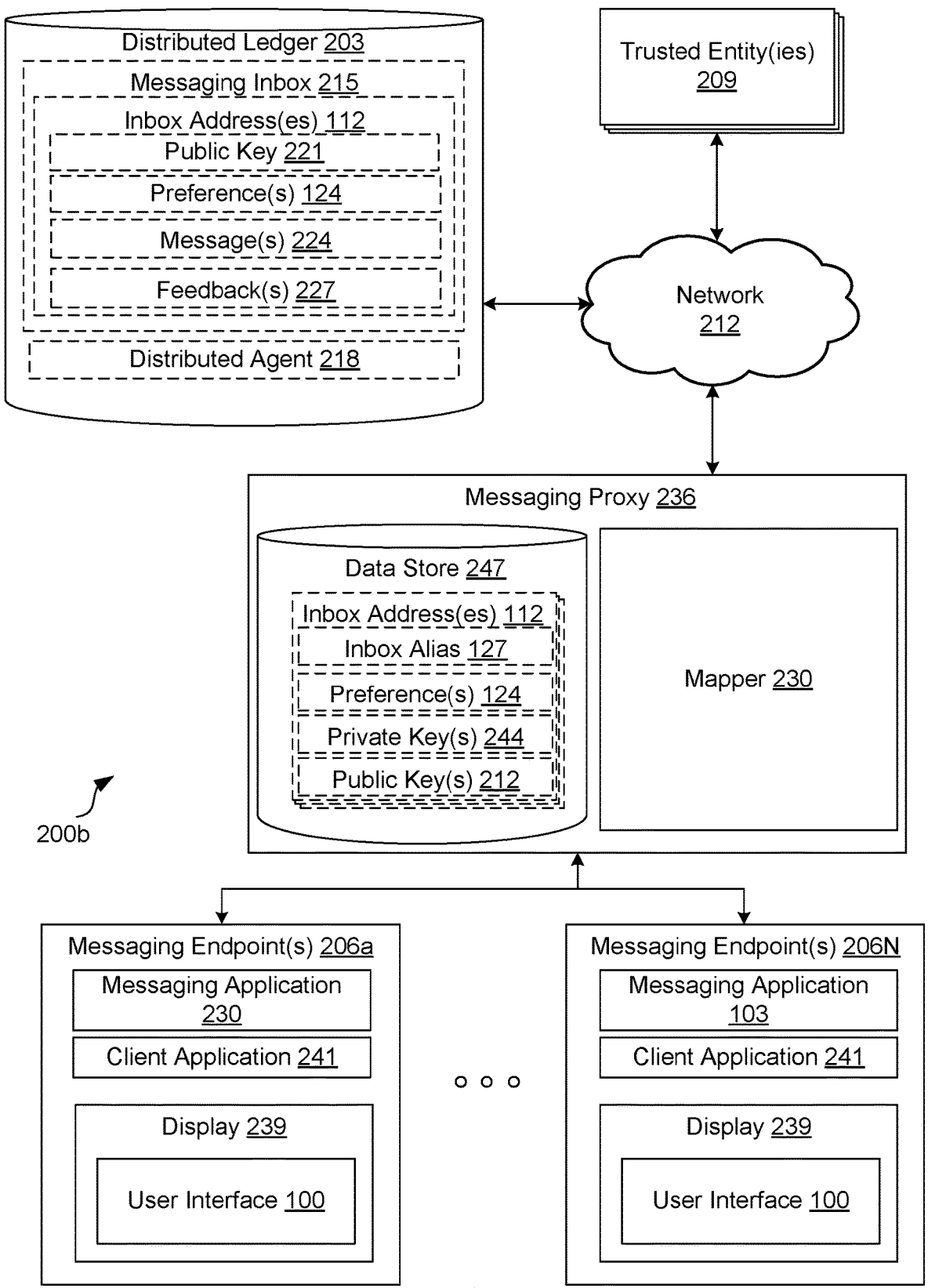

A distributed agent 218 can further be configured to interact with a mapper 233 on a messaging endpoint 206 or a messaging proxy 236 (FIG. 2B). For example, a distributed agent 218 can receive requests from the mapper 233 for generating messaging inboxes 215, transmit notifications of received messages 224 associated with a given inbox address 112, provide copies of messages 224 to a recipient messaging endpoint 206, and/or other actions. In some examples, a distributed agent 218 can interact with a trusted entity 209 for verification and certification of a given inbox address 112.

In some implementations, a distributed agent 218 can also be programmed to encrypt the content stored on the distributed ledger 203. For example, when a messaging inbox 215 is created or updated using a distributed agent 218, the distributed agent 218 can encrypt the new or updated messages 224 associated with the messaging inbox 215 prior to committing them to the distributed ledger 203. Accordingly, a distributed agent 218 may accept a public key 221 associated with the inbox address 112 when a messaging inbox 215 is created to allow or facilitate encryption of messages 224 stored in the distributed ledger 203 in association with the messaging inbox 215. However, in other implementations, the mapper 233 or messaging application 230 can encrypt information with the public key 221 prior to sending the message 224 to a distributed ledger 203 or supplying the message 224 to the distributed agent 218 for recording in the messaging inbox 215 on the distributed ledger 203.

The messaging endpoints 206 are representative of a plurality of computing devices that can be coupled to the network 212. A messaging endpoint 206 can include a computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The messaging endpoint 206 can include one or more displays 239, such as liquid crystal displays (LCDs), gas plasma-based flat panel displays, organic light emitting diode (OLED) displays, electrophoretic ink ("E-ink") displays, projectors, or other types of display devices. In some instances, the display 239 can be a component of the messaging endpoint 206 or can be connected to the messaging endpoint 206 through a wired or wireless connection.

Various applications or other functionality can be executed in the messaging endpoint 206 according to various embodiments. The components executed on a messaging endpoint 206 can include a messaging application 230, a mapper 233, a client application 241, and other applications, services, processes, systems, engines, or functionality not discussed in detail herein.

The messaging application 230 can include any type of messaging system that allows for asynchronous communication (e.g., SMS, Text Messaging, email, direct messaging, etc.). For example, the messaging application 230 can include an email application that interacts with an email server (not shown) to send and/or receive messages 224 associated with an email address. In some examples, the messaging application 230 can include a stand-alone messaging application (e.g., MICROSOFT OUTLOOK, MOZILLA THUNDERBIRD, TWITTER, SNAPCHAP, INSTAGRAM, FACEBOOK MESSENGER, etc.). In other examples, the messaging application 230 can include a browser-based messaging application (e.g., GOOGLE's GMAIL service, YAHOO's YAHOO MAIL service, etc.).

The mapper 233 can be executed to interact with the distributed ledger 203 to establish messaging inboxes 215 and send/receive messages to/from the inboxes 215 maintained by the distributed ledger 203. For example, the mapper 233 can generate an inbox address 112 for a messaging inbox 215 and send a request to the distributed ledger 203 to establish and register the messaging inbox 215 within the distributed ledger 203 according to the inbox address 112. The mapper 233 can further generate a key-pair associated with the created inbox address 112. The key-pair can represent an asymmetric cryptographic key-pair that includes a public key 221 and a private key 244. The cryptographic keys in the key-pair can be used by an entity or user to confirm or otherwise authenticate their relationship with or control over messages 224 associated with the inbox address 112, as described later. The key-pair can be generated using various approaches, such as elliptic curve cryptography (ECC) approaches or using the Rivest-Shamir-Adleman (RSA) algorithm.

The mapper 233 can further interact with the distributed ledger 203 to send and/or receive messages 224 using the inbox address 112 to provide a decentralized identity for the user. According to various embodiments, the mapper 233 can be integrated with the messaging application 230 as a plugin, extension, or other suitable software. As such, the user can interact with the messaging application 230 to send, receive, and/or otherwise manage messages associated with traditional messaging platforms and the decentralized messaging platform of the present disclosure.

The client application 241 can be executed in a messaging endpoint 206 to access network content served up by servers, thereby rendering a user interface 100 on the display 239. To this end, the client application 241 can include a browser, a dedicated application, or other executable and the user interface 100 can include a network page, an application screen, and other user mechanisms for obtaining user input. The messaging endpoint 206 can be configured to execute applications beyond the client application 241 such as social networking applications, word processors, spreadsheets, or other applications.

Also, various data is stored in a data store 247 that is accessible to the messaging endpoint 206. The data store 247 can be representative of a plurality of data stores 247, which can include relational databases, object-oriented databases, hierarchical databases, hash tables or similar key-value data stores, as well as other data storage applications or data structures. The data stored in the data store 247 is associated with the operation of the various applications or functional entities described below. This data can include inbox address(es) 112, and potentially other data.

An inbox address 112 can include an identifier that represents a destination in the distributed ledger 203 for messages 224 sent to the user. For example, the inbox address 112 can include a string of alphanumeric characters that are created by the mapper 233 using cryptographic algorithms or other suitable algorithms. In some examples, the inbox address 112 can correspond to a bitcoin address or other suitable types of identifiers for the distributed ledger 203.

The inbox address(es) 112 can be mapped to data corresponding to the inbox addresses 112 that is included in the data store 247. The data may include, for example, an inbox alias 127, user-defined preferences 124, a private key 244, a public key 221, and or other data.

The inbox alias 127 can include an identifier that is used to represent the messaging inbox 215. For example, a user may define the inbox alias 127 through interactions with a user interface 100 of the messaging application 230. The messaging application 230 may display the inbox alias 127 to the user to identify the messaging inbox 215. In some examples, a user may select the inbox alias 127 to represent the inbox desired to send and/or view messages from. The mapper 233 can translate the inbox alias 127 to the inbox address 112 when the inbox alias 127 is selected by the user or otherwise used by the messaging application 230 to send and/or receive messages 224.

The user-defined preferences 124 can include a list of preferences that define the content that is to be associated with the inbox 215. For example, the user-defined preferences 124 can correspond to themes or topics of content that may be included in content sent to the user. As such, the distributed agent 218 may filter content sent to the inbox address 112 based on the user-defined preferences 124 so that the messages 224 that are mapped to the inbox address 112 in the distributed ledger 203 include content permitted by the user-defined preferences 124.

The public key 221 and a private key 244 correspond to an asymmetric cryptographic key-pair created by the mapper 233. The cryptographic keys in the key-pair can be used by an entity or user to confirm or otherwise authenticate their relationship with or control over messages 224 associated with the inbox address 112. For example, the private key 244 can be used to decrypted messages 224 received that are encrypted using the public key 221. The key-pair can be generated using various approaches, such as elliptic curve cryptography (ECC) approaches or using the Rivest-Shamir-Adleman (RSA) algorithm.

A trusted entity 209 can include an entity that has previously interacted with a messaging endpoint 206 with respect to a given inbox address 112 and has a known reputation with the user of the messaging endpoint 206 that meets a given threshold to be considered trusted. Based on the prior interactions, the trusted entity 209 can provide feedback 227 which can be stored in the distributed ledger 203 and can be used to verify and/or otherwise certify the inbox address 112 for other messaging endpoints 206. For example, a trusted entity 209 may be associated with an electronic commerce organization that has processed one or more transactions with a user using a given inbox address 112. As the user interacts with the trusted entity 209, the trusted entity 209 can provide feedback 227 to the distributed agent 218 based on the interactions. The feedback 227 can be used to verify or otherwise certify the associated inbox address 112.

According to various embodiments, the trusted entity 209 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the trusted entities 209 can employ a plurality of computing devices that can be arranged in one or more server banks or computer banks or other arrangements. Such computing devices can be located in a single installation or can be distributed among many different geographical locations. For example, the trusted entities 209 can include a plurality of computing devices that together can include a hosted computing resource, a grid computing resource or any other distributed computing arrangement. In some cases, the trusted entities 209 can correspond to an elastic computing resource where the allotted capacity of processing, network, storage, or other computing-related resources can vary over time.

With reference to FIG. 2B, shown is a network environment 200b according to various embodiments. The network environment 200ba includes a distributed ledger 203, a messaging proxy 236, and one or more trusted entities 209, which are in data communication with each other via a network 212. The network environment 200b differs from the network environment 200a of FIG. 2A in that the mapper 233 is executed by the messaging proxy 236 instead of the messaging endpoint 206. Further, a plurality of messaging endpoints 206 (e.g., 206a . . . 206N) are connected to the network through the messaging proxy 236. For example, the network environment 200b of FIG. 2B may be used in an enterprise setting where the plurality of messaging endpoints 206 are managed by the enterprise and the messages 224 exchanged for each messaging endpoint 206 are exchanged through the use of a messaging proxy 236 which is connected to the network 212.

The messaging proxy 236 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Various applications or other functionality can be executed in the messaging proxy 236 according to various embodiments. The components executed on the messaging proxy 236 include a mapper 233, and other applications, services, processes, systems, engines, or functionality not discussed in detail herein. The mapper 233 has the same functionality as described with respect to FIG. 2A.

Also, various data is stored in a data store 247 that is accessible to the messaging proxy 236. The data store 247 can be representative of a plurality of data stores 247, which can include relational databases, object-oriented databases, hierarchical databases, hash tables or similar key-value data stores, as well as other data storage applications or data structures. The data stored in the data store 247 is associated with the operation of the various applications or functional entities described below. This data can include the data described regarding the data store 247 of FIG. 2A.

Next, a general description of the operation of the various components of the network environments 200a, 200b is provided. Although the following general description illustrates an example operation, the individual components of the network environment 200 (e.g., 200a, 200b) can interact with or operate in other manners. Example alternatives are identified in the accompanying discussion of subsequent figures.

To begin, a user interacting with a messaging application 230 on a messaging endpoint 206 may wish to create a messaging inbox 215 that is registered and maintained in a distributed ledger 203. According to various embodiments, the messaging application 230 can be integrated with a mapper 233, as shown in FIG. 2A, or the messaging application 230 can be in communication with a mapper 233 via a messaging proxy 236, as shown in FIG. 2B. Regardless of the location of the mapper 233, the mapper 233 is configured to generate an inbox address 112 for the requested inbox 215 and request the creation of an inbox for the inbox address 112 through a call to a node of the distributed ledger 203.

In response to the request to generate a messaging inbox 215, the messaging application 230 may send a request to the mapper 233 to initiate the creation of the messaging inbox 215. The request may include user-defined preferences 124 for the permitted content to be associated with the messaging inbox 215.

According to various embodiments, the mapper 233 can generate an inbox address 112 and a key-pair including a public key 221 and a private key 244 which can be used for authentication purposes. The inbox address 112 can include a string of alphanumeric characters that can be used to locate messages 224 received by the distributed ledger 203.

Upon creation of the inbox address 112, the mapper 233 can store the inbox address 112 and corresponding public key 221 and private key 244 in the data store 247 of the messaging endpoint 206. The mapper 233 can then send a request to the distributed ledger 203 through a call requesting creation and registration of a messaging inbox 215 based on the inbox address 112. The request can further include the public key 221 as well as used defined preferences 124 associated with the inbox 215.

The call can initiate the implementation of a distributed agent 218 in the distributed ledger 203 based at least in part on the inbox address 112 and user defined preferences 124. The distributed agent 218 can cause the inbox 215 to be registered in the distributed ledger 203 and can generate a map to associate received messages 224 and the inbox address 112.

According to various embodiments, the distributed agent 218 can receive messages 224 from one or more messaging endpoints 206 and store the messages 224 in the distributed ledger 203 based on the inbox address 112. In some embodiments, the distributed agent 218 can determine whether the content of the received message 224 is permitted for storage according to the user-defined preferences 124. For example, if the content is marketing material for cars, and the messaging inbox 215 is created for only fashion and fitness content, the distributed agent 218 may decide not to store the received message 224 in the distributed ledger 203 for the inbox address 112. Likewise, if the content is determined to be related to fashion marketing, the message 224 may be stored in the distributed ledger 203.

In some embodiments, when a message 224 is received and stored in the distributed ledger 203, the distributed agent 218 may send a push notification to a mapper 233 associated with the recipient messaging endpoint 206 to notify the mapper 233 of the received message 224. In other embodiments, the mapper 233 may send poll requests to the distributed agent 218 to determine if any messages 224 have been received by the distributed agent 218 and stored in the distributed ledger 203.

Upon request, the distributed agent 218 can transmit a copy of the message 224 to the recipient messaging endpoint 206. If the message 224 is encrypted, the messaging application 230 or the mapper 233 may decrypt the message 224 using the private key 244 and the messaging application 230 may render the message 224 via a user interface 100 of the messaging application 230 to allow the recipient to view the message 224.

Figure 3:
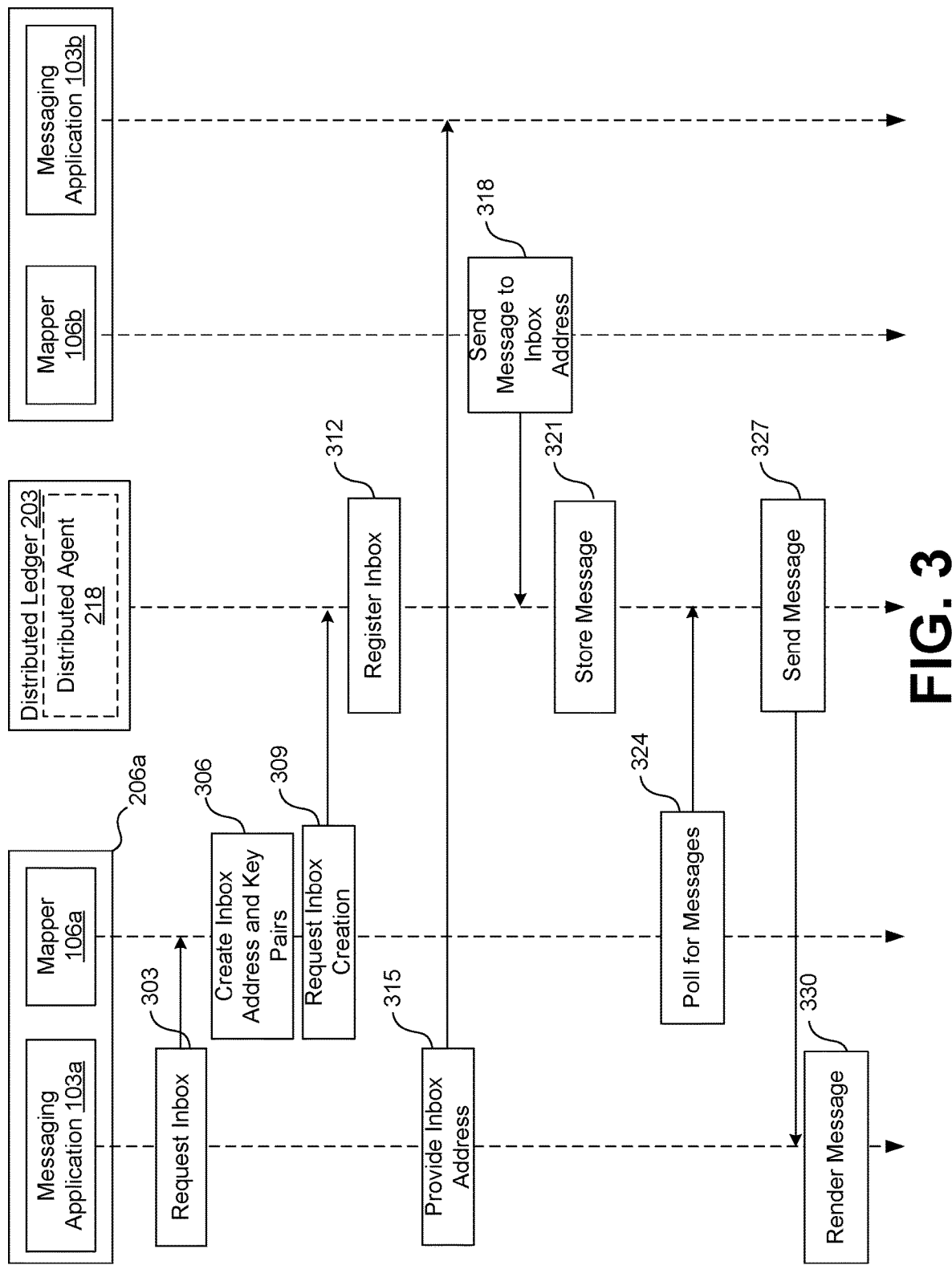
FIGS. 3-5 are sequence diagrams illustrating examples of functionality implemented as portions of the network environment of FIG. 2 according to various embodiments of the present disclosure.

Turning now to FIG. 3, a sequence diagram that provides an example of the operation of the components of the network environment 200. It is understood that the sequence diagram of FIG. 3 provides merely an example of the many different types of functional arrangements that can be employed to implement the operation of the depicted portion of the network environment 200a. As an alternative, the sequence diagram of FIG. 3 can be viewed as depicting an example of elements of a method implemented within the network environment 200a. It should be noted that although the sequence diagram of FIG. 3 illustrates the mapper 233 being included within the messaging endpoint 206, as shown in the network environment 200a, similar operations occur when the mapper 233 is included within the messaging proxy 236 of the network environment 200b.

In particular, the sequence diagram of FIG. 3 depicts the functionality associated with a user interacting with a messaging application 230a on a first messaging endpoint 206a and requesting an inbox 215 to be generated on the distributed ledger 203. Further, the sequence diagram relates to the functionality associated with communicating with a third party entity associated with a second messaging endpoint 206b via the generated inbox 215.

To begin, a user can interact with a messaging application 230a on a first messaging endpoint 206a. The user may request the creation of a messaging inbox 215. In some examples, the user may specify preferences 124 that may be associated with the messaging inbox 215. For example, the user may specify preferences 124 that define the type of content or subject matter of messages 224 that the user is interested in receiving through the messaging inbox 215. In response to receiving a request to generating the messaging inbox 215, at box 303, the messaging application 230a may send a request to the mapper 233 to request a messaging inbox 215. The request may include the preferences 124 and inbox alias 127 that are defined by the user and are to be associated with the created inbox 215.

At box 306, the mapper 233a can generate an inbox address 112 that is to be associated with the inbox 215. For example, the mapper 233 can generate the inbox address 112 by generating a string of alphanumeric characters using cryptographic algorithms or other suitable algorithms. The inbox address 112 can be used to identify an inbox 215 in the distributed ledger 203. In some examples, the inbox address 112 corresponds to a blockchain address.

The mapper 233 can generate a key-pair for the messaging inbox 215 and inbox address 112. The key-pair may represent an asymmetric cryptographic key-pair that includes a public key 221 and a private key 244. The cryptography keys in the key-pair can be used by an entity or the user to confirm or otherwise authenticate their relationship with or control over messages 224 sent or received thought the inbox 215. The mapper 233*a* can encrypt and store the private key 244 in the data store for authentication and decryption of messages 224 received via the messaging inbox 215.

At box 309, the mapper 233 can send a call to a node on the distributed ledger 203 requesting a generation of a messaging inbox 215 in the distributed ledger 203. The call can translate to the implementation of a distributed agent 218 which can be generated according to the parameters of the inbox 215 (e.g., inbox address 112, preferences 124, etc.). According to various embodiments, the requesting call may include specific information about the messaging inbox 215. For example, the information may include the associated public key 221, the defined preferences 124, the inbox address, 112, and/or other information that may be used by the distributed agent 218 in creating and registering the requested messaging inbox 215.

At box 312, the distributed agent 218 can generate and register the messaging inbox 215 in the distributed ledger 203 according to the user defined preferences 124. The messaging inbox 215 can be registered in association with the particular inbox address 112. Furthermore, the inbox 215 can be registered according to the user defined preferences 124. For example, the distributed agent 218 can be implemented to filter messages 224 being received from third party entities based at least in part on the user defined preferences 124 associated with the messaging inbox 215. In some examples, the messaging inbox 215 can be registered to the public to allow third party entities the ability to access the inbox address 112 with the messaging inbox 215 provided by the distributed ledger 203.

At box 315, the messaging application 230*a* or other client application 241 on the first messaging endpoint 206*a* can send the inbox address 112 to a messaging application 230*b* or client application 241 on the second messaging endpoint 206*b*. For example, a third party entity associated with the second messaging endpoint 206*b* may request an address 112 for electronically communicating with the user. To maintain privacy, the user may provide the third party entity with the inbox address 112 generated by the mapper 233*a* in response to a request by the third party entity for an inbox address 112 instead of the user's primary messaging address corresponding to the messaging application 230*a*.

At box 318, the second messaging endpoint 206*b*, via the mapper 233*b* or the messaging application 230*b*, can send a message 224 using the inbox address 112 provided by the user of the first messaging endpoint 206*a*. In particular, the mapper 233*b* or the messaging application 230*b* can transmit the message 224 over the network 212 to a node on the distributed ledger 203. Since the message 224 includes the inbox address 112, the distributed agent 218 can determine a location for storage of the message 224 in the distributed ledger 203.

At box 321, the distributed agent 218 can determine if the content of the message is permitted for storage based on the user defined preferences 124 associated with the messaging inbox 215. If the content of the message is permitted for storage, the distributed agent 218 can cause the message 224 to be stored in the distributed ledger 203 based on the inbox address 112.

At box 324, the mapper 233*a* of the first messaging endpoint 206*a* can poll the distributed agent 218 for messages received in association with the inbox address 112. In some examples, the distributed agent 218 can send a push notification to the mapper 233 to indicate that a message 224 has been received and stored relative to the inbox address 112.

At box 327, the distributed agent 218 can send the message 224 to the messaging application 230*a* or mapper 233*a* in response to receiving a request for the message 224. For example, the distributed agent 218 may receive a request for received messages 224 from the messaging endpoint 206*a*. The request may include the inbox address 112 and the distributed agent 218 can identify any messages 224 that are stored in the distributed ledger 203 in association with the inbox address 112. Upon identifying the messages 224 stored in the distributed ledger 203, the distributed agent 218 can send copies of the messages 224 to the messaging endpoint 206*a*.

At box 330, the messaging application 230*a* can render the message 224 for display to allow the user to review the message 224. In some examples, the message 224 may be encrypted using the corresponding public key 221 associated with the messaging inbox 215 and inbox address 112. Accordingly, prior to rendering the message 224, the messaging application 230*a* or the mapper 233*a* may decrypt the message 224 using the corresponding private key 244 stored in the data store 247.

Figure 4:
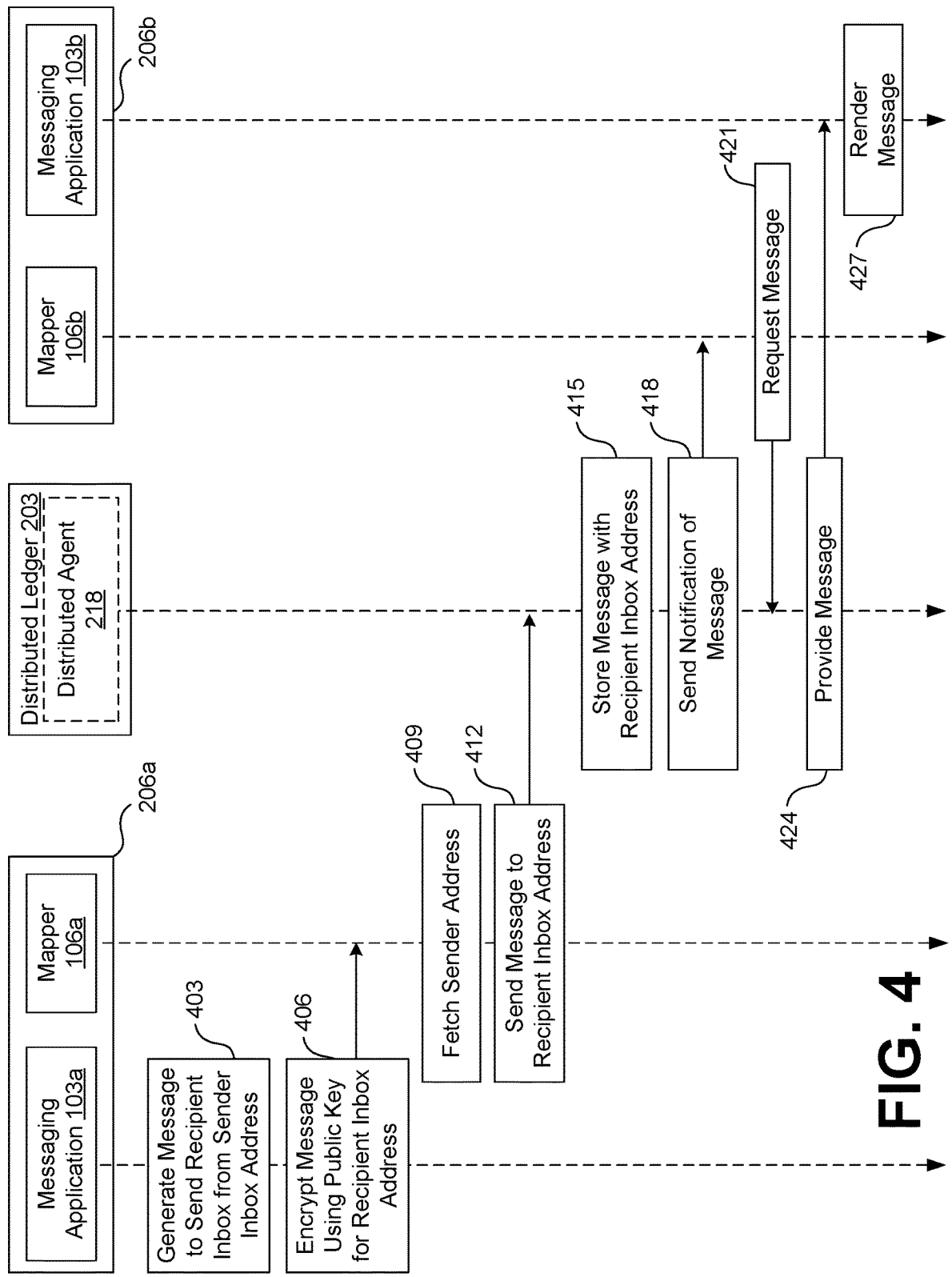

Turning now to FIG. 4, a sequence diagram that provides another example of the operation of the components of the network environment 200*a*. It is understood that the sequence diagram of FIG. 4 provides merely an example of the many different types of functional arrangements that can be employed to implement the operation of the depicted portion of the network environment 200*a*. As an alternative, the sequence diagram of FIG. 4 can be viewed as depicting an example of elements of a method implemented within the network environment 200*a*. In particular, the sequence diagram of FIG. 4 depicts the functionality associated with a user interacting with a messaging application 230*a* on a first messaging endpoint 206*a* and sending a message 224 to a user associated with a second messaging endpoint 206*b* using a inbox address 112 associated with the distributed ledger 203. It should be noted that although the sequence diagram of FIG. 4 illustrates the mapper 233 being included within the messaging endpoint 206, as shown in the network environment 200*a*, similar operations occur when the mapper 233 is included within the messaging proxy 236 of the network environment 200*b*.

To begin, in box 403, the messaging application 230*a* can generate a message 224 to send to a recipient messaging inbox 215 from a sender inbox address 112. For example, through interactions with a user interface 100 similar to that of the example of FIG. 1D, a user may request generation of a message 224 to send to a recipient. The user may provide an inbox address 112 that is associated with a messaging inbox 215 registered through the distributed ledger 203. The user may further indicate an inbox alias 127 to be associated with the sending of the message. For example, the message 224 may be sent using the user's primary messaging address or using an inbox address 112 associated with a messaging inbox 215.

At box 406, the messaging application 230a or mapper 233a can encrypt the message using the public key 221 associated with the recipient inbox address 112. The public key 221 can be obtained from the distributed ledger 203 in response to a request by the messaging application 230a or the mapper 233a. According to various embodiments, the request may include the recipient inbox address 112 which can be used to identify the corresponding public key 221. In other embodiments, the mapper 233 may identify the recipient public key 221 from an address book in the data store 247.

At box 409, the mapper 233a can fetch the sender inbox address 112 from the data store 247 according to the indicated sender alias 127. For example, the mapper 233a may translate the sender alias 127 to the sender inbox address 112 according to the mapping defined in the data store 247. At box 412, the mapper 233a sends the message 224 to the distributed ledger 203 using the recipient inbox address 112. For example, the mapper 233a may send a call to the distributed agent 218 indicating that a message 224 is to be stored in the distributed ledger 203 in accordance to the recipient inbox address 112.

At box 415, the distributed agent 218 stores the message 224 in the distributed ledger 203 in response to determining that the message 224 content satisfies the recipient defined preferences 124 of the messaging inbox 215. For example, the distributed agent 218 may analyze the message 224 to determine the content of the message 224. In some examples, the distributed agent 218 may determine the content according to a keyword comparison with words in the message 224 and a predefined list of keywords. In other examples, the distributed agent 218 can determine the content based on the sender of the message 224. Regardless, upon determining the content of the message 224, the distributed agent 218 can determine if the content matches any of the user-defined preferences 124 associated with the inbox address 112.

At box 418, the distributed agent 218 can send a push notification to the mapper 233b associated with the recipient to notify the mapper 233b that a message 224 has been stored in the distributed ledger 203. In some embodiments, the mapper 233b may poll the distributed agent 218 to determine if a message 224 has been stored in the distributed ledger 203.

At box 421, the mapper 233b associated with the recipient messaging endpoint 206b may send a request to the distributed ledger 203 to obtain the stored message 224. In particular, the mapper 233b can transmit the message 224 over the network 212 to a node on the distributed ledger 203. Since the message 224 includes the inbox address 112, the distributed agent 218 can determine a location for storage of the message 224 in the distributed ledger 203.

At box 424, the distributed agent 218 provides the message 224 to the mapper 233b. For example, the distributed agent 218 on the distributed ledger 203 may receive a request for received messages 224 from mapper 233b on the messaging endpoint 206a. The request may include the inbox address 112 and the distributed agent 218 can identify any messages 224 that are stored in the distributed ledger 203 in association with the inbox address 112. Upon identifying the messages 224 stored in the distributed ledger 203, the distributed agent 218 can send copies of the messages 224 to the messaging endpoint 206a.

At box 427, the messaging application 230b associated with the recipient messaging endpoint 206b can decrypt the message 224 using the corresponding private key 244 and renders the message 224 on a user interface 100 to allow the recipient to view the message 224. For example, the messaging application 230b may access the private key 244 associated with the inbox address to decrypt the message 224 that was encrypted by the sender or the distributed agent 218 using the corresponding public key 221. Once decrypted, the messaging application 230b can render the message 224 via a user interface 100.

Figure 5:
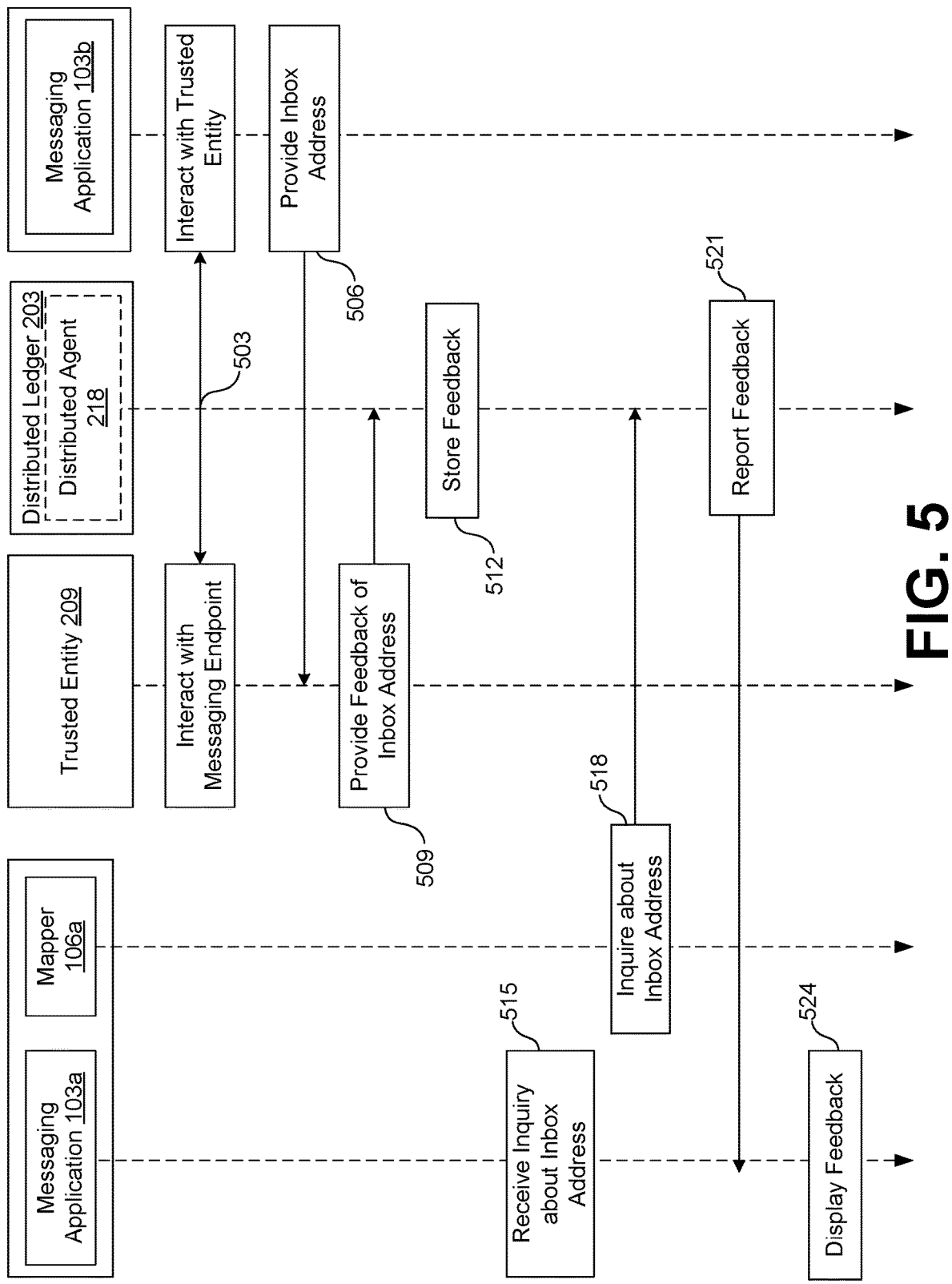

Referring next to FIG. 5, a sequence diagram that provides another example of the operation of the components of the network environment 200a. It is understood that the sequence diagram of FIG. 5 provides merely an example of the many different types of functional arrangements that can be employed to implement the operation of the depicted portion of the network environment 200a. As an alternative, the sequence diagram of FIG. 5 can be viewed as depicting an example of elements of a method implemented within the network environment 200. In particular, the sequence diagram of FIG. 5 depicts the functionality associated with verifying or otherwise certifying an inbox address 112 based on feedback obtained from a trusted entity 209. It should be noted that although the sequence diagram of FIG. 5 illustrates the mapper 233 being included within the messaging endpoint 206, as shown in the network environment 200a, similar operations occur when the mapper 233 is included within the messaging proxy 236 of the network environment 200b.

To begin, at box 503, a messaging application 230b of a messaging endpoint 206 associated with a user may be interacting with a trusted entity 209. For example, the trusted entity 209 can include a banking institution and the user may be interacting with the banking institution via the messaging application 230a with respect to various transactions (e.g., applying for a loan, applying for a credit extension, requesting to open an account, etc.). During the interactions, the trusted entity 209 can request an inbox address 112 to associate with the user. At box 506, the messaging application 230b can provide an inbox address 112 to the trusted entity 209 in response to the request.

As the trusted entity 209 can interact with the user associated with the inbox address 112, the trusted entity 209 may develop feedback associated with the user. For example, if the interactions with the user are positive, the trusted entity 209 may formulate positive feedback based on the interactions. Likewise, if the interactions are negative, the developed feedback may be negative.

At box 509, the trusted entity 209 can provide feedback 227 to the distributed ledger 203 based at least in part on the inbox address 112. In some examples, the trusted entity 209 can send feedback to the distributed ledger 203 in response to a request for feedback 227 based on the inbox address 112. In other embodiments, the trusted entity 209 can send feedback 227 to the distributed ledger 203 in response to generating feedback 227 with respect to the inbox address 112.

At box 512, the distributed ledger 203 stores the feedback 227 according to the inbox address 112. For example, a distributed agent 218 can identify the feedback 227 received from the trusted entity 209 and can store the feedback 227 in the distributed ledger 203 according to the inbox address 112. As such, the feedback 227 is mapped to the inbox address 112 in the distributed ledger 203.

At box 515, a messaging application 230a at a first messaging endpoint 206a may receive an inquiry about an inbox address 112. For example, the user may have obtained the inbox address 112 and may want to verify or otherwise certify the inbox address 112.

At box 518, the mapper 233a of the first messaging endpoint 206a can implement an inquiry call to a node of the distributed ledger 203 to determine if there is any feedback 227 associated with the inbox address 112. For example, the mapper 233a can send a request to the distributed ledger 203 that includes the inbox address 112. The request can include an indication that the mapper 233a is inquiring whether there is any feedback 227 associated with the inbox address 112.

At box 521, the distributed ledger 203 can determine if there is any feedback 227 associated with the given inbox address 112 and send the feedback 227 to the mapper 233a or messaging application 230a of the requesting messaging endpoint 206a. For example, the distributed agent 218 can determine if any feedback 227 is mapped to the inbox address 112. If feedback 227 is mapped to the inbox address, the distributed agent 218 can access the feedback 227 and send a copy of the feedback 227 to the requesting messaging endpoint 206a.

At box 524, the messaging application 230a can display the feedback 227 for review of the user of the inquiring messaging endpoint 206a. According to various embodiments, the feedback 227 may include an identification of the trusted entity 209 associated with the feedback 227. Based on the feedback 227 and the origin of the feedback 227, the user can determine whether to engage in future communications using the inbox address 112.

Figure 6:
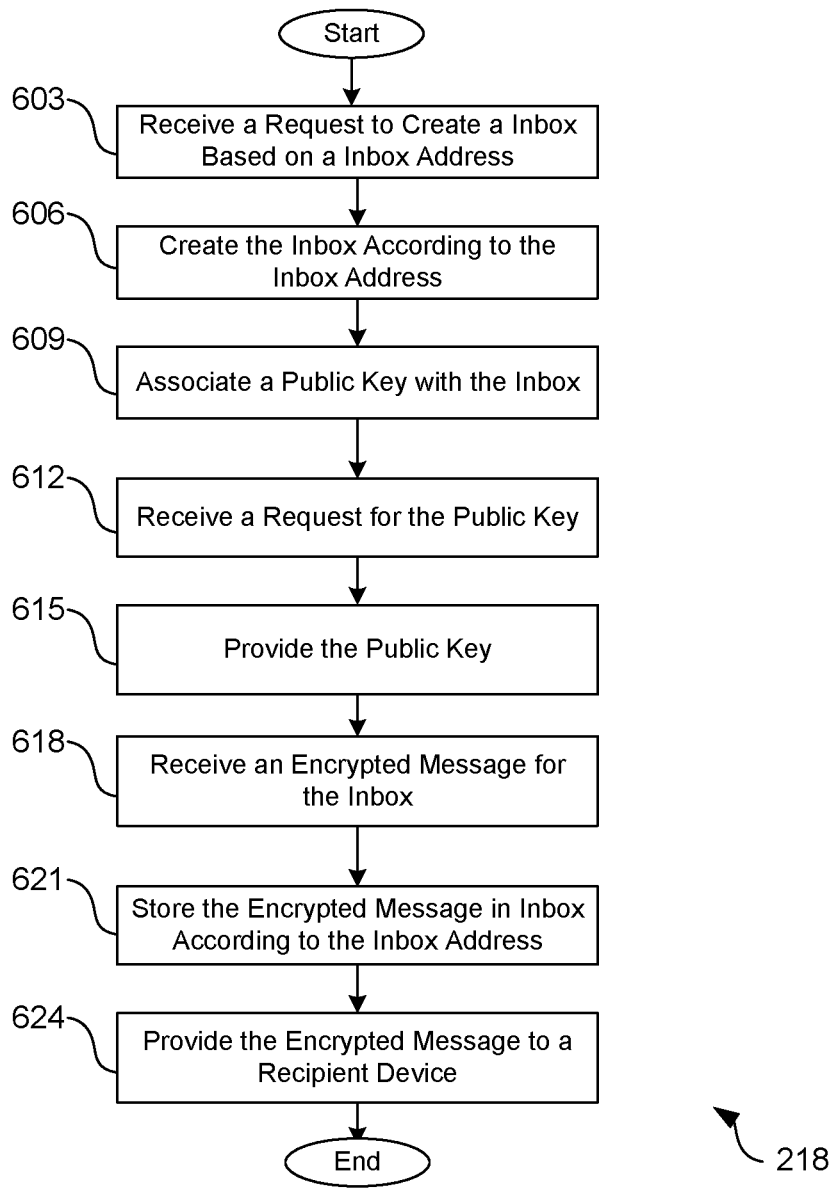
FIG. 6-7 are flowcharts illustrating examples of functionality implemented as portions of the network environment of FIG. 2 according to various embodiments of the present disclosure.

Referring next to FIG. 6, shown is a flowchart that provides one example of the operation of a portion of the distributed agent 218. It is understood that the flowchart of FIG. 6 provides merely an example of the many different types of functional arrangements that can be employed to implement the operation of the depicted portion of the distributed agent 218. As an alternative, the flowchart of FIG. 6 can be viewed as depicting an example of elements of a method implemented within the network environment 200a or the network environment 200b.

Beginning with box 603, the distributed agent 218 can receive a request to create a messaging inbox 215 according to an inbox address 112. For example, the distributed agent 218 can receive the request in response to a call from a mapper 233 of a messaging endpoint 206. According to various embodiments, the request may include the inbox address 112 generated by the mapper 233, a public key 221 created for the inbox address 112, user-defined preferences 124 to be associated with the inbox 215, and/or any other type of information.

At box 606, the distributed agent 218 can create and register the inbox 215 in the distributed ledger 203 according to the inbox address 112. For example, the distributed agent 218 can create an inbox 215 by associating a portion of the distributed ledger 203 with the inbox address 112. As such, any messages 224 received by the distributed ledger 203 that are directed to the inbox address 112 will be associated with the inbox 215 in the distributed ledger 203 such that the messages 224 are mapped to the inbox address 112.

At box 609, the public key 221 included in the request can be stored in the distributed ledger in association with the inbox 215. For example, the public key 221 may be stored in the distributed ledger 203 and mapped to or otherwise associated with the inbox address 112.

At box 612, the distributed agent 218 receives a request for the public key 221 associated with the inbox address 112. For example, a mapper 233 of a third party messaging endpoint 206 may send a call to the distributed ledger 203 that results in a request to the distributed agent 218 for the public key 221. The public key 221 may be used by the third party messaging endpoint 206 to encrypt a message 224 to be received by the distributed ledger 203 with respect to the inbox address 112.

At box 615, the distributed agent 218 obtains the public key 221 from the distributed ledger 203 and sends a copy of the public key 221 to the requesting mapper 233. For example, the distributed agent 218 can determine a location of the public key 221 that is mapped to the inbox address 112 in the distributed ledger. Upon determining a location of the public key, the distributed agent 221 can send a copy of the public key 221 to the requesting mapper 233.

At box 618, the distributed agent 218 receives an encrypted message 224 from the mapper 233. The encrypted message 224 is associated with the inbox address 112 of the recipient. In particular, the encrypted message 224 is encrypted 224 using the public key 221 that was previously sent to the mapper 233.

At box 621, the distributed agent 218 stores the encrypted message 224 in the distributed ledger 203. For example, the distributed agent 218 determines a location for storage of the encrypted message 224 in the distributed ledger 203 according to the corresponding inbox address 112. As such, using a consensus method, the encrypted message 224 can be written reliably to the distributed ledger 203 and mapped to the inbox address 112.

At box 624, the distributed agent 218 provides the encrypted message 224 to a recipient messaging endpoint 206 associated with the inbox address 112. In some examples, the encrypted message 224 is provided in response to sending a push notification to the mapper 233a of the recipient messaging endpoint 206 notifying the recipient messaging endpoint 206 that that a message 224 has been received and stored in the distributed ledger 203. In other embodiments, the mapper 233a may poll the distributed ledger 203 to determine whether a message 224 has been received. In this example, the distributed agent 218 may provide the encrypted message 224 to the recipient messaging endpoint 206 in response to such a poll request. According to various embodiments, the recipient messaging endpoint 206 may decrypt the encrypted message using the private key 244 for the inbox address 112.

Figure 7:
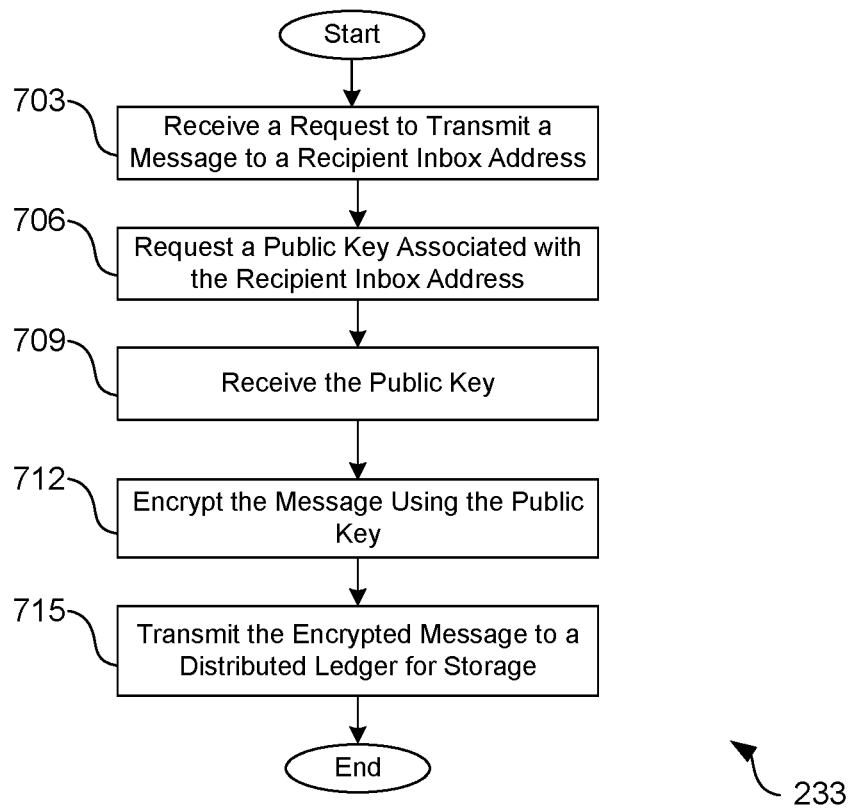

Referring next to FIG. 7, shown is a flowchart that provides one example of the operation of a portion of the mapper 233. It is understood that the flowchart of FIG. 7 provides merely an example of the many different types of functional arrangements that can be employed to implement the operation of the depicted portion of the mapper 233. As an alternative, the flowchart of FIG. 7 can be viewed as depicting an example of elements of a method implemented within the network environment 200a or the network environment 200b.

To begin, at box 703, the mapper 233 can receive a request to transmit a message 224 to a recipient inbox address 112 that is associated with an inbox maintained through the distributed ledger 203. For example, a user can generate a message 224 through interactions with the messaging application 230. The user may provide a recipient inbox address 112 that indicates an inbox 215 that is maintained by the distributed ledger 203. The messaging application 230 can send the request to transmit the message to the distributed ledger 203 to the mapper 233.

At box 706, the mapper 233 can send a request to the distributed ledger 203 for a public key 221 associated with the recipient inbox address 112. For example, the mapper 233 may wish to encrypt the message 224. As such, the mapper 233 will need the public key 221 associated with the recipient inbox address 112 for encryption purposes.

At box 709, the mapper 233 can receive the public key 221 from the distributed ledger 203. For example, in response to the request for the public key 221, the distributed agent 218 can send the public key 221 corresponding to the recipient inbox address 112 to the mapper 233.

At box 712, the mapper 233 can encrypt the message 224 using the public key 221 obtained from the distributed ledger 203. For example, prior to sending the message 224 to the recipient inbox address 112, the mapper 233 can encrypt the message 224 using the public key 221 so that the message 224 can be securely transmitted.

At box 715, the mapper 233 can transmit the encrypted message 224 to the distributed ledger 203 for storage. For example, the mapper 233 can instantiate a call to a node on the distributed ledger 203 that results in the transmission and storage of the encrypted message 224 in the distributed ledger 203.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same messaging endpoint 206.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
    receiving a request to send a message directed to a recipient inbox address of a recipient inbox that is registered and maintained on a blockchain, the request including the message and the recipient inbox address, the recipient inbox address corresponding to a location on the blockchain associated with the recipient inbox, and the recipient inbox address being used to send and receive one or more messages to and from the recipient inbox;
    sending a request for a public key associated with the recipient inbox address to the blockchain, the public key being stored in the blockchain and mapped to the recipient inbox address;
    encrypting the message based on the public key in response to receiving the public key from the blockchain; and
    transmitting the encrypted message to the blockchain, the message being stored in the blockchain according to the recipient inbox address.

2. The method of claim 1, wherein the blockchain is hosted by a plurality of computing devices configured to store data according to a consensus agreement.

3. The method of claim 1, further comprising receiving a request to generate a sender inbox in the blockchain, the encrypted message being transmitted to the recipient inbox address associated with the sender inbox.

4. The method of claim 3, further comprising generating a sender inbox address for the sender inbox.

5. The method of claim 4, further comprising causing the sender inbox to be created in the blockchain, the sender inbox being associated with the sender inbox address and the public key.

6. The method of claim 5, further comprising obtaining another message from the sender inbox in the blockchain according to the sender inbox address.

7. A system, comprising:
    a blockchain comprising a plurality of computing devices configured to store data according to a consensus agreement among the plurality of computing devices;
    a distributed agent executable on at least one of the plurality of computing devices, wherein when executed, the distributed agent causes the at least one of the plurality of computing devices to at least:
        receive a request from a client device for a public key associated with an inbox registered and maintained via the blockchain, the request including an inbox address associated with the inbox, the inbox address corresponding to a location on the blockchain associated with the inbox, the public key being stored in the blockchain and mapped to the inbox address;
        provide the public key to the client device;
        receive an encrypted message from the client device, the encrypted message being encrypted according to the public key, and the encrypted message being directed to the inbox address; and
        store the encrypted message in the inbox maintained by the blockchain, the encrypted message being stored in the inbox based at least in part on the inbox address.

8. The system of claim 7, wherein the client device comprises a first client device, and when executed, the distributed agent further causes the at least one of the plurality of computing devices to at least receive a request to establish the inbox in the blockchain from a second client device, the request including the inbox address and the public key.

9. The system of claim 8, wherein, when executed, the distributed agent further causes the at least one of the plurality of computing devices to at least:
    create the inbox identified with the inbox address; and
    associate the inbox with the public key.

10. The system of claim 7, wherein the inbox is associated with one or more user preferences, and when executed, the distributed agent further causes the at least one of the plurality of computing devices to at least:
    determine a content type associated with the encrypted message; and
    determine that the content type is included in the one or more user preferences associated with the inbox, the encrypted message being stored in the inbox when the content type is included in the one or more user preferences.

11. The system of claim 7, wherein, when executed, the distributed agent further causes the at least one of the plurality of computing devices to at least:
    obtain a pull request for the encrypted message from the client device; and
    provide the encrypted message to a recipient client device in response to receiving the pull request.

12. The system of claim 7, wherein, when executed, the distributed agent further causes the at least one of the plurality of computing devices to at least send the encrypted message to a recipient client device.

13. A non-transitory computer readable medium comprising machine-readable instructions that, when executed by a processor of at least one computing device, cause the at least one computing device to at least:
receive a request to send a message directed to a recipient inbox address of a recipient inbox that is registered and maintained on a blockchain, the request including the message and the recipient inbox address, the recipient inbox address corresponding to a location on the blockchain associated with the recipient inbox, and the recipient inbox address being used to send and receive one or more messages to and from the recipient inbox;
send a request for a public key associated with the recipient inbox address to the blockchain, the public key being stored in the blockchain and mapped to the recipient inbox address;
encrypt the message based on the public key in response to receiving the public key from the blockchain; and
transmit the encrypted message to the blockchain, the encrypted message being stored in the blockchain according to the recipient inbox address.

14. The non-transitory computer readable medium of claim 13, wherein the blockchain is hosted by a plurality of computing devices configured to store data according to a consensus agreement.

15. The non-transitory computer readable medium of claim 13, wherein, when executed, the machine-readable instructions further cause the at least one computing device to at least receive a request to generate a sender inbox in the blockchain, the encrypted message being transmitted to the recipient inbox address associated with the sender inbox.

16. The non-transitory computer readable medium of claim 15, wherein, when executed, the machine-readable instructions further cause the at least one computing device to at least generate a sender inbox address for the sender inbox.

17. The non-transitory computer readable medium of claim 16, wherein, when executed, the machine-readable instructions further cause the at least one computing device to at least cause the sender inbox to be created in the blockchain, the sender inbox being associated with the sender inbox address and the public key.

18. The non-transitory computer readable medium of claim 17, wherein, when executed, the machine-readable instructions further cause the at least one computing device to at least obtain another message from the sender inbox in the blockchain according to the sender inbox address.

19. The non-transitory computer readable medium of claim 13, wherein the recipient inbox is associated with one or more user preferences.

20. The non-transitory computer readable medium of claim 19, wherein, when executed, the machine-readable instructions further cause the at least one computing device to at least:
determine a content type associated with the encrypted message; and
determine that the content type is included in the one or more user preferences associated with the recipient inbox, the encrypted message being stored in the recipient inbox when the content type is included in the one or more user preferences.

* * * * *